Aug. 11, 1953  E. K. RALSTON  2,648,319
VALVE ROTATING DEVICE
Filed June 9, 1949  2 Sheets-Sheet 1
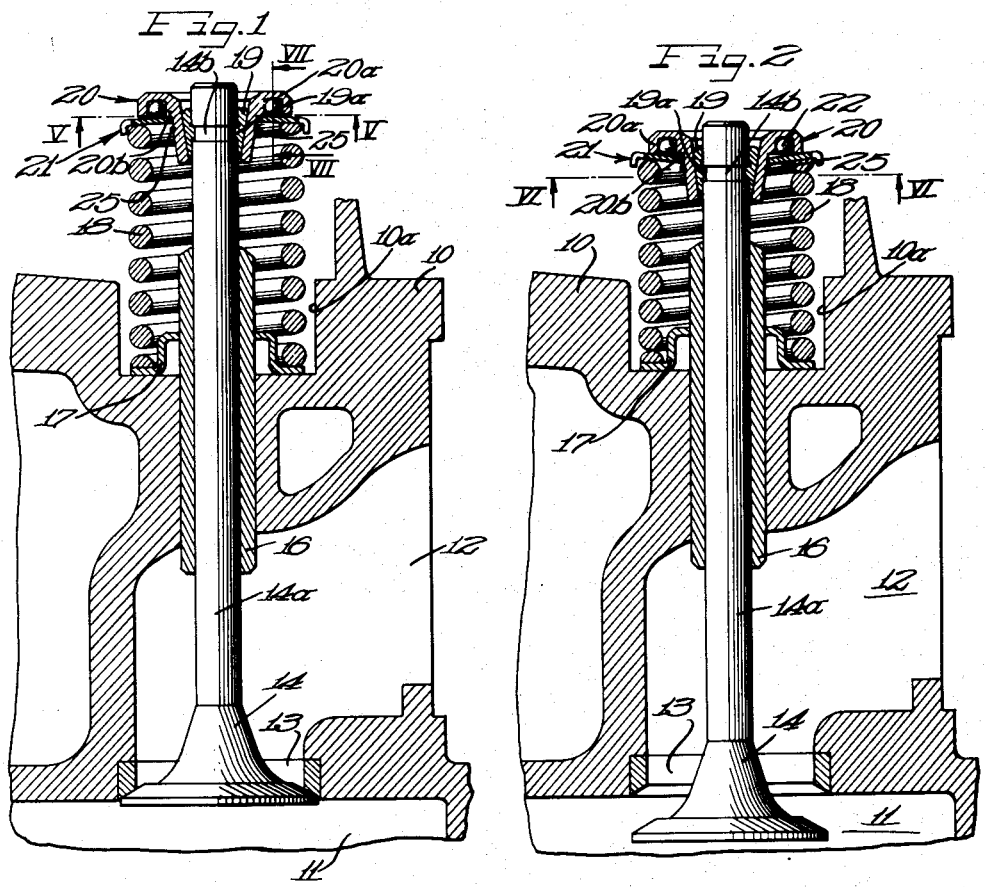
Inventor
Eldon K. Ralston
By The Firm of Charles W. Hills Attys

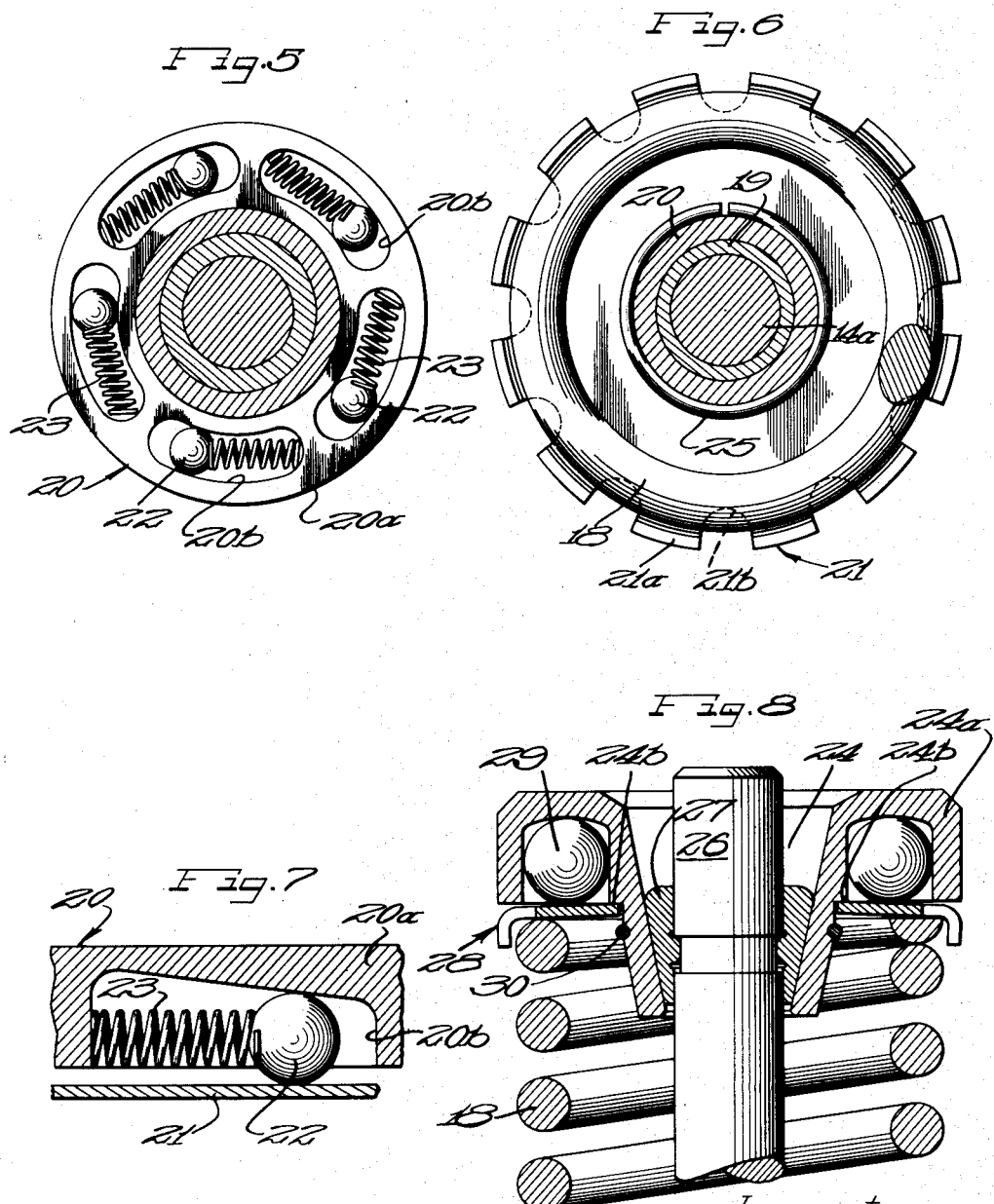

Patented Aug. 11, 1953

2,648,319

UNITED STATES PATENT OFFICE 2,648,319

VALVE ROTATING DEVICE

Eldon K. Ralston, Cleveland Heights, Ohio, assignor to Thompson Products, Inc., Cleveland, Ohio, a corporation of Ohio Application June 9, 1949, Serial No. 98,039

11 Claims. (Cl. 123—90)

1

This invention relates to devices for rotating valves, and more specifically relates to a simplified readily installed compact self-contained unit for rotating a poppet valve each time the valve head is raised from its seat and the load on the valve spring is thereby increased.

In my prior Patent 2,397,502, granted April 2, 1946, the valve rotating unit included a valve spring collar seat which is eliminated without loss of function in accordance with this invention.

According to the general features of the present invention, the conventional valve spring retainer of a spring pressed poppet valve is replaced with an assembly including a retainer cap carrying shiftable elements such as balls, rollers, wedges or the like, and a deflectable resilient member itself forms a seat receiving spring loading. The retainer cap is fixed against relative rotation on the valve stem and the resilient member itself forms a seat receiving the valve spring and is so constructed as to selectively convey the spring load to the retainer cap or to the shiftable elements therein. Under increased spring loads, as when the valve is opened, the resilient member will deflect relative to the container cap and will transfer the load to the shiftable elements which will then shift to effect relative rotation between the retainer cap and the resilient member. Since the retainer cap is fixed upon the valve stem, the valve will be rotated each time the valve head is raised off its seat.

Since the heretofore used separate valve spring seat collar is eliminated, the retainer cap can be enlarged without enlarging the overall diameter of the assembly. This makes possible the use of larger and more efficient shiftable elements.

The rotation of poppet valves during operation of internal combustion engines and the like keeps the valve seat and the valve stem free of carbon and similar deleterious substances. Furthermore, rotation of poppet valves greatly enhances the wearing characteristics of the valve seat.

It is, then, an object of the present invention to provide a simplified, compact, self-contained valve-rotating device.

A further object of the invention is to provide a poppet valve-rotating device constructed from a minimum number of simple parts which is easy to manufacture and which may be installed on the valve assembly of an internal combustion engine with great facility.

A still further object of the invention is to provide a poppet valve-rotating device wherein a load

2 transferring resilient member also acts as a valve spring seat collar and makes possible the use of a larger retainer cap without increasing the overall dimensions of the device.

Yet another object of this invention is to provide a poppet valve-rotating device which is more compact than similar devices heretofore provided and which is, therefore, more easily adaptable for installation on internal combustion engines of varying design.

Many other features, advantages and further objects of the present invention, as well as the specific nature thereof, will become manifest to those skilled in the art upon making reference to the detailed description which follows and the annexed sheets of drawings which, by way of illustrative example, set forth a preferred embodiment of the invention.

On the drawings:

Figure 1 is a cross-sectional view, with parts in elevation, of a poppet valve assembly equipped with a valve-rotating device embodying the principles of this invention;

Figure 2 is a view similar to Figure 1, but illustrating the position of the parts when the valve is opened;

Figure 3 is an enlarged plan view of a blank used to form a deflectable resilient member employed in the present invention;

Figure 4 is an enlarged bottom plan view of the member shown in Figure 3;

Figure 5 is an enlarged cross-sectional view taken on line V—V of Figure 1, showing additional details of construction of the retainer cap employed in the present invention;

Figure 6 is an enlarged cross-sectional view taken on line VI—VI of Figure 2;

Figure 7 is a fragmentary enlarged cross-sectional view with parts in elevation, taken substantially on the plane of line VII—VII of Figure 1, showing additional details of construction of the valve-rotating device of this invention; and Figure 8 is an enlarged fragmentary vertical cross-sectional view, with parts in elevation, of a modified form of a valve-rotating device according to this invention.

As shown on the drawings:

In Figures 1 and 2, the reference numeral 10 designates an engine part such as, for example, a portion of the cylinder head of an internal combustion engine. The engine part 10 defines a wall of a combustion chamber 11 and a port 12, such as an exhaust port, having a seat ring 13 secured in the mouth thereof and presenting a beveled seating face for accommodating the head of a poppet valve 14. The stem 14a of the valve 14 is slidably mounted in a stem guide 16 carried by the engine part 10 and projects through a wall of the engine part 10 into a recess 10a.

A ring 17 may be provided and arranged in the bottom of the recess 10a to bottom a valve spring 18.

The valve stem 14a has a conventional retainer lock groove 14b formed therein near the tip end thereof so as to coact with a bead 19a of a retainer lock 19.

According to this invention, a valve-rotating device may be interposed between the retainer lock 19 and the spring 18 for automatically rotating the valve 14 relative to the engine part 10 each time the valve is opened.

The valve-rotating device of this invention includes a retainer cap 20 having a collar portion which may be firmly locked to the valve stem 14a by the retainer lock 19 and a deflectable resilient member 21 which is arranged to convey spring loading from the spring 18 to the retainer cap 20. A plurality of shiftable elements 22 are arranged between the retainer cap 20 and the deflectable resilient member 21.

More specifically, the retainer cap 20, as may be most clearly seen on Figures 5 and 7, is provided with an annular housing portion 20a defining a plurality of circumferentially disposed grooves 20b which form races for the shiftable elements 22.

In this embodiment, the shiftable elements take the form of steel balls and the grooves 20b are provided with inclined bottoms. A plurality of coil springs 23 act upon the shiftable elements 22 to normally urge them to the shallow ends of the grooves 20b.

The deflectable resilient member 21 is shown in Figures 3 and 4 as comprising a washer ring, preferably made of spring metal or the like which may be formed from a stamped blank (Figure 3) to define a flanged periphery 21a scalloped as at 21b. The flanged periphery 21a provides a retaining slot to center the valve spring 18 by surrounding the end coil thereof and the scalloped portion 21b improves the resilience of the washer ring. A central aperture 21c may be provided so that the ring 21 may be arranged in surrounding relationship to the retainer cap 20 and in abutting relationship to a shoulder 20b presented by the annular housing portion 20a. A snap ring 25 may be locked in a peripheral groove formed in the retainer cap 20 so as to preclude inadvertent disassembly of the member 21 from the cap 20.

When installed on the valve assembly of an internal combustion engine, the valve rotating device of the present invention is arranged in such a manner as to have the spring 18 seated within the flanged confines prescribed by the member 21. Thus, when the head of the poppet valve 14 is seated on the seat ring 13 so that the valve 14 is in a closed position, the load imposed on the valve-rotating device by the spring 18 is insufficient to bow or deflect the member 21 over the shiftable elements 22, and the major portion of the spring load resulting from the bias of the spring 18 will be transmitted by the member 21 directly to the shoulder 20b defined by the annular housing portion 20a of the cap retainer 20. In this position, the coiled springs 23 will urge the shiftable elements 22 into the shallow ends of the grooves 20b until they snugly contact the flat bearing surface presented by the member 21.

When the poppet valve 14 is raised off of its seat 13 to open the port 12, the valve spring 18 will be compressed and the load on the member 21 will be increased beyond the flexing point thereof. The member 21 will then be bowed or deflected radially to bear heavily on the shiftable elements 22 and the inner peripheral portion of the member 21 in the locality of the aperture 21c will only lightly engage the inner portion of the shoulder 20b defined by the annular housing portion 20a of the cap retainer 20. The main load will actually be transferred from the cap retainer 20 to the shiftable elements 22. When the spring load is transferred to the shiftable elements 22, they will roll down the inclined raceways defined by the grooves 20b toward the deeper ends thereof.

The deflectable resilient member 21 is relatively stationary inasmuch as it is secured against rotation by virtue of its contact engagement with the valve spring 18. Therefore, the retainer cap 20 will be rotated by the shiftable elements 22, thereby driving the valve 14 and causing it to rotate. It will be apparent that the retainer cap 20 will be shifted relative to the member 21 and the engine part 10 for an appreciable distance in direction to align all of the shiftable elements 22 in a deeper portion of the grooves 20b. It will be further evident that the amount of shifting can be closely controlled by accurately determining the angle of inclination of the inclined raceways defined by the grooves 20b and the length of the grooves 20b. When the valve closes and the spring load on the deflectable member 21 is again reduced below the load required for deflection of the member, it will move back against the retainer cap and off of the balls, whereupon the springs 23 will shift the balls into the shallow ends of the grooves and the device will again be in valve-rotating position.

The embodiment of Figure 8 illustrates a valve-rotating device which is very similar to that shown and previously described in connection with Figures 1 and 2. However, in Figure 8, the retainer cap 24 locked to the stem 26 of a poppet valve by a retainer lock 27 is provided with an annular housing portion 24a of substantially equal outer diameter with the outer diameter defined by a deflectable resilient member 28.

As may be seen in Figure 8, the deflectable resilient member 28 is formed in the same manner as the member 21 (Figures 3 and 4) and normally abuts a shoulder 24b defined by the annular housing portion 24a of the cap retainer 24 when the valve is seated in a closed position. A snap ring 30 is locked to the cap retainer 24 to preclude inadvertent disassembly of the valve-rotating device.

Because a valve-rotating device constructed in accordance with the provisions of this invention employs a deflectable member 28 which not only develops the function of transmitting the spring load to the cap retainer but also seats the valve spring, provides a bearing race surface for the shiftable elements, and acts as a closure member coacting with the locking wire on the retainer cap, the retainer cap 24 easily accommodates proportionally larger shiftable elements 29 within the same overall dimensions. It will be evident to those skilled in the art that the use of larger shiftable elements is highly advantageous since wear characteristics are greatly improved, and as a result wear on both the shiftable elements 29 and the deflectable resilient member 28 will be reduced.

Furthermore, the compact integration obtained with the use of a simplified valve-rotating device such as herein described facilitates the construction of the retainer cap 24 and the deflectable resilient member 28 to define smaller outside diameters than have heretofore been possible, thereby improving the adaptability of a valve-rotating device to valve assemblies on internal combustion engines which vary widely as to design characteristics.

The simplification of a valve-rotating device accomplished by the present invention also results in a substantial reduction in weight, particularly of the cap retainer as well as the other elements of the valve-rotating device, which feature is highly desirable in that the stem end of poppet valve need not be unnecessarily burdened with a cumbersome structure.

It will be apparent to those versed in the art that I have described a valve-rotating device which eliminates the necessity of providing a separate spring seating collar element and in which a reduced number of simplified parts may be employed which afford a compact assembly displaying improved wear characteristics and adaptability features.

Although I have resorted to detail in the description of my invention for the sake of clarity, it should be understood that I do not propose to be limited to the specific embodiments herein shown by way of illustrative example only, but desire to embrace within the scope of this patent all such modifications as reasonably and properly come within the spirit of my contribution to the art.

I claim as my invention:

1. A valve rotating device for a spring loaded poppet valve comprising a retainer cap provided with circumferentially inclined raceways and adapted to be connected to a valve stem, shiftable elements in said raceways, springs urging said elements towards the shallow ends of the raceways, and a deflectable resilient spring washer confining said shiftable elements in said raceways, said washer having a peripheral ring portion normally engaging said retainer cap and seating against a valve spring for transferring normal spring loads directly to said retainer cap, said washer being deflectable over said shiftable elements in response to increased spring loads when the valve is operated to transfer the increased loads to said shiftable elements whereupon said elements will move into the deeper ends of the raceways and rotate the retainer cap relative to the spring washer.

2. In combination with a stemmed poppet valve and coil spring closing means for said valve, a valve rotating device interposed between the valve stem and the coil spring closing means having a cap on said valve stem for rotation therewith, a spring washer having a depending flange surrounding the coil spring and an annular wall arranged to be interposed between the coil spring and said cap to convey spring loads to said cap and shiftable elements associated with said cap and arranged to engage the wall of said washer to rotatably drive the cap when said washer is deflected by increased spring loads during opening of the valve.

3. A valve rotating device for a spring loaded poppet valve comprising, in combination, a retainer cap having a collar adapted for receiving a valve stem and defining an annular housing with a plurality of circumferentially disposed raceways having inclined bottoms therein, shiftable elements movable in said raceways, biasing means normally urging said shiftable elements toward the shallow ends of said raceways, a deflectable spring-seating resilient washer around said collar and having a wall normally engaging said retainer cap and seating the valve spring, and means cooperable with said collar to retain said washer in fitted assembly with said retainer cap to confine the shiftable elements in the raceways, said washer being deflectable under increased loads to transfer such increased loads to said shiftable elements, whereupon said retainer cap will be rotatably driven.

4. A valve rotating unit of the type adapted to be interposed between a valve spring and a valve stem of a spring loaded poppet valve comprising, an annular retainer adapted to be connected to a valve stem, and a deflectable resilient ring seating against a valve spring, said retainer having a plurality of circumferentially spaced open faced inclined raceways adjacent said ring and each raceway being provided with a spring biased shiftable element movable in each corresponding raceway, said shiftable elements being confined in said raceways by said ring, said ring adapted to transmit normal spring loading directly to said retainer but being deflectable in response to increased load to bow over said shiftable elements, whereby said retainer will be rotated relative to said ring by said shiftable elements.

5. A valve rotating device comprising, in combination, a retainer adapted to be connected to a valve stem and defining an annular housing with a plurality of circumferentially disposed raceways having inclined bottoms therein, shiftable elements movable in said raceways, biasing means normally urging said shiftable elements toward the shallow ends of said raceways, and a deflectable resilient washer normally engaging said retainer and having a flanged periphery providing a recess in which to locate a valve spring, said member being deflectable under increased loads to transfer such loads to said shiftable elements, whereupon said retainer will be rotatably driven.

6. A valve rotating device comprising, in combination, a retainer adapted to be connected to a valve stem and defining an annular housing with a plurality of circumferentially disposed raceways having inclined bottoms therein, shiftable elements movable in said raceways, biasing means normally urging said shiftable elements toward the shallow ends of said raceways and a deflectable resilient member normally engaging said retainer, said member having a peripherally flanged ring portion constituting a wall adapted to provide a bearing surface for said shiftable elements on one face thereof and to seat a valve spring on the other face thereof, said wall being deflectable under increased loading to transfer said loading to said shiftable elements, whereupon said retainer will be rotatably driven by said elements.

7. A valve rotating device comprising, in combination, a retainer adapted to be connected to a valve stem, shiftable elements carried by said retainer, and a deflectable resilient member, said member having a peripherally flanged scalloped flange and a deflectable annular wall adapted to shoulder against a portion of said retainer as well as provide a bearing surface for said shiftable elements on one face thereof and to seat a valve spring on the other face thereof, said member being deflectable under increased loads to transfer such loads away from shoulder contact with said retainer to said shiftable elements, whereupon said retainer will be rotatably driven by said shiftable elements.

8. In a valve rotating device of the type having a retainer cap carrying shiftable elements therein arranged to rotatively drive said cap under load and adapted to be connected to a spring loaded valve stem, the improvement of a resilient washer having a ring-like body portion adapted to abuttingly engage the retainer cap and constituting a wall having one face thereof adapted to engage the shiftable elements and the other face thereof adapted to engage the spring loading the valve stem, whereby said washer will convey normal spring loading to said retainer cap, said wall being resiliently deflectable to bow under increased load, thereby to convey such increased load to said shiftable elements.

9. In a valve rotating device of the type having a retainer cap carrying shiftable elements therein arranged to rotatively drive said cap under load and adapted to be connected to a spring loaded valve stem, the improvement of a resilient washer having a ring-like body portion adapted to abuttingly engage the retainer cap and constituting a wall having one face thereof adapted to engage the shiftable elements and the other face thereof adapted to engage the spring loading the valve stem, whereby said washer will convey normal spring loading to said retainer cap, said wall being resiliently deflectable to bow under increased load, thereby to convey such increased load to said shiftable elements, said washer further including a peripheral flange on said wall adapted to provide a recess in which the spring loading the valve stem may be located.

10. In a valve rotating device of the type having a retainer cap carrying shiftable elements therein arranged to rotatively drive the cap under load and adapted to be connected to a spring loaded valve stem, the improvement of a resilient washer having a ring-like body portion adapted to abuttingly engage the retainer cap and constituting a wall having one face thereof adapted to engage the shiftable elements and the other face thereof adapted to engage the spring loading the valve stem, whereby said washer will convey normal spring loading to said retainer cap, said wall being resiliently deflectable to bow under increased load, thereby to convey such increased load to said shiftable elements, said washer further including a peripheral flange on said wall adapted to provide a recess in which the spring loading the valve stem may be located, said peripheral flange being scalloped to improve the resilience of said wall of said resilient washer.

11. A valve rotating unit of the type adapted to be interposed between a valve spring and a valve stem of a spring loaded poppet valve comprising, an annular retainer adapted to be connected to a valve stem, a deflectable resilient ring seating against the valve spring, said retainer having a plurality of circumferentially spaced open faced inclined raceways adjacent said ring and each raceway being provided with a spring biased shiftable element movable in each corresponding raceway, said shiftable elements being confined in said raceways by said ring, said ring adapted to transmit normal spring loading directly to said retainer but being deflectable in response to increased load to bow over said shiftable elements, whereby said retainer will be rotated relative to said ring by said shiftable elements, and retaining means cooperating between said ring and said retainer to preclude inadvertent disassembly of the valve rotating unit.

ELDON K. RALSTON.

References Cited in the file of this patent

UNITED STATES PATENTS

| Number | Name | Date |
|---|---|---|
| 2,397,502 | Ralston | Apr. 2, 1946 |